United States Patent
Zhang et al.

(10) Patent No.: US 8,891,597 B1
(45) Date of Patent: Nov. 18, 2014

(54) CALIBRATION FOR IMPLICIT TRANSMIT BEAMFORMING

(75) Inventors: Hongyuan Zhang, Fremont, CA (US); Rohit U. Nabar, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 313 days.

(21) Appl. No.: 13/185,464

(22) Filed: Jul. 18, 2011

Related U.S. Application Data

(60) Provisional application No. 61/374,503, filed on Aug. 17, 2010, provisional application No. 61/416,252, filed on Nov. 22, 2010.

(51) Int. Cl.
*H04B 1/38* (2006.01)

(52) U.S. Cl.
USPC .............. 375/220; 375/267; 455/69; 455/101

(58) Field of Classification Search
USPC ................ 455/101, 103, 115.1, 127.1, 127.3, 455/234.1, 280, 425, 450, 69, 522, 63.1, 455/67.11, 454, 456.1, 456.5, 507, 561, 455/562.1, 67.14, 90.2; 370/203, 206, 208, 370/210, 241, 329, 336, 338, 246, 252, 280, 370/315, 319, 334, 335, 344; 375/130, 141, 375/148, 219, 220, 227, 229, 232, 260, 262, 375/267, 294–297, 299, 324, 329, 341, 346, 375/348, 371, 373, 376
See application file for complete search history.

(56) References Cited

U.S. PATENT DOCUMENTS

| | | | |
|---|---|---|---|
| 7,599,332 B2 | 10/2009 | Van Zelst et al. | |
| 7,729,439 B2 | 6/2010 | Zhang et al. | |
| 7,742,390 B2 | 6/2010 | Mujtaba | |
| 8,374,273 B1 | 2/2013 | Zhang et al. | |
| 8,619,907 B2 | 12/2013 | Mujtaba et al. | |
| 8,644,368 B1 | 2/2014 | Zhang et al. | |
| 2005/0169391 A1* | 8/2005 | Takeda et al. | 375/259 |
| 2006/0098580 A1* | 5/2006 | Li et al. | 370/245 |

(Continued)

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

(Continued)

*Primary Examiner* — Golam Sorowar

(57) ABSTRACT

In a beamforming method, one or more compensation factor sets are applied to antennas of a first communication device. A modulation and coding scheme (MCS) for communicating with a second communication device is selected while applying a first compensation factor set to the antennas of the first communication device. For each of the one or more compensation factor sets, (i) a steering matrix is developed based on a data unit received at the first communication device from the second communication device, (ii) one or more data units are transmitted from the first communication device to the second communication device while applying the steering matrix and the compensation factor set to the first plurality of antennas, and (iii) a channel performance indicator is determined based on the one or more data units. A compensation factor set to be used in subsequent beamforming operations is selected based on the channel performance indicator.

28 Claims, 10 Drawing Sheets

(56) References Cited

U.S. PATENT DOCUMENTS

| | | | | |
|---|---|---|---|---|
| 2006/0183504 | A1* | 8/2006 | Tanaka et al. | 455/561 |
| 2006/0255989 | A1* | 11/2006 | Kim et al. | 341/120 |
| 2007/0206504 | A1* | 9/2007 | Koo et al. | 370/245 |
| 2008/0089396 | A1* | 4/2008 | Zhang et al. | 375/220 |
| 2008/0187061 | A1* | 8/2008 | Pande et al. | 375/260 |
| 2009/0047999 | A1* | 2/2009 | Xia et al. | 455/562.1 |
| 2009/0207765 | A1* | 8/2009 | Yamaura | 370/310 |
| 2010/0091675 | A1 | 4/2010 | Sawai | |
| 2010/0111215 | A1* | 5/2010 | Nandagopalan et al. | 375/267 |

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

"IEEE Std 802.16 2009 (Revision of IEEE Std. 802.16-2004), IEEE Standard for Local and metropolitan area networks: Part 16: Air Interface for Broadband Wireless Access Systems," *The Institute of Electrical and Electronics Engineers, Inc.*, May 29, 2009.

"IEEE P802.11™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11 n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

S. A. Mujtaba, "IEEE P802.11—Wireless LANs, TGn Sync Proposal Technical Specification," *The Institute of Electrical and Electronics Engineers, Inc.*, doc.: IEEE 802.11—04/0889r6, May 2005.

van Nee et al. "The 802.11 n. MIMO-OFDM Standard for Wireless LAN and Beyond," Wireless Personal Communications, vol. 37, pp. 445-453 (Jun. 2006).

Nabar et al., U.S. Appl. No. 13/077,485, filed Mar. 31, 2011.

\* cited by examiner

CALIBRATION FOR IMPLICIT TRANSMIT BEAMFORMING

CROSS-REFERENCES TO RELATED APPLICATIONS

This disclosure claims the benefit of the following U.S. Provisional Patent Applications:
U.S. Provisional Patent Application No. 61/374,503, filed on Aug. 17, 2010;
U.S. Provisional Patent Application No. 61/416,252, filed on Nov. 22, 2010.
The disclosures of all of the above-referenced patent applications are hereby incorporated by reference herein in their entireties.

FIELD OF TECHNOLOGY

The present disclosure relates generally to communication systems and, more particularly, to beamforming techniques used in such communication systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some wireless communication systems, one or more communication devices employ multiple antennas. Accordingly, a communication channel between two such devices can be a multiple-input, multiple-output (MIMO) channel when both communication devices employ multiple antennas, a single-input, multiple-output (SIMO) channel when a transmitting device ("the transmitter") employs a single transmit antenna and the receiving device ("the receiver") employs multiple receive antennas, or a multiple-input, single-output (MISO) channel the transmitter employs multiple transmit antennas and the receiver employs a single receive antenna. Referring for simplicity to MIMO communication systems, transmission and reception properties in these systems can be improved by using each of the various transmit antennas to transmit the same signal while phasing (and amplifying) this signal as it is provided to the various transmit antennas to achieve beamforming or beamsteering. Generally speaking, beamforming or beamsteering creates a spatial gain pattern having one or more lobes or beams (as compared to the gain obtained by an omni-directional antenna) in one or more particular directions, while generally reducing the gain over that obtained by an omni-directional antenna in other directions. If the gain pattern is configured to produce a high gain lobe in the direction of each of the receiver antennas or in the direction of the receiver antennas in general, the MIMO system can obtain better transmission reliability between a particular transmitter and a particular receiver, over that obtained by single transmitter-antenna/receiver-antenna systems.

To conduct beamforming in the direction of a receiver, a transmitter generally utilizes a steering matrix determined based on specifics of the forward channel (i.e. the channel from the transmitter to the receiver) to condition the signals applied to various transmission antennas so as to produce the desired transmit gain pattern. In a technique known as explicit beamforming, to determine the specifics of the forward channel, such as the channel state information (CSI) or other measured description of the forward channel, the transmitter first sends training data to the receiver, which then determines or estimates forward channel specifics and/or a steering matrix that specifies beamsteering coefficients for steering signals from the transmitter in the direction of the receiver and then transmits this information back to the transmitter. In implicit beamforming, on the other hand, the transmitter determines specifics of the reverse channel (the channel from the receiver to the transmitter) based on training signals that the transmitter receives from the receiver and estimates the forward channel from the reverse channel by assuming channel reciprocity. However, radio frequency (RF) chain impairments in the form of gain/phase imbalances impair reciprocity between the forward and the reverse channel, and therefore, in implicit beamforming, the transmitter generally compensates for these RF chain imbalances in some manner (e.g., through calibration and/or correction) to achieve the desired transmission pattern.

Some explicit and implicit beamforming techniques as well as some calibration techniques are described in the IEEE 802.11n Draft Standard (2009), incorporated herein fully by reference.

SUMMARY

In an embodiment, a method for beamforming within a communication system, wherein the communications system includes (i) a first communication device having a first plurality of antenna and (ii) a second communication device having a second plurality of antennas, includes applying one or more of a plurality of compensation factor sets to the first plurality of antennas, wherein each compensation factor set includes at least one compensation factor. The method also includes selecting a modulation and coding scheme (MCS) for communicating with the second communication device while applying a first compensation factor set to the first plurality of antennas. The method further includes, for each of the one or more compensation factor sets (i) developing a steering matrix based on a data unit received at the first communication device from the second communication device, (ii) transmitting one or more data units from the first communication device to the second communication device while applying the steering matrix and the compensation factor set to the first plurality of antennas, and (iii) determining a channel performance indicator based on the one or more data units. The method further still includes selecting, based on the channel performance indicator, a compensation factor set to be used in subsequent beamforming operations.

In another embodiment, an apparatus for use in a communication system comprises a plurality of antennas and a network interface configured to i) select a modulation and coding scheme (MCS) for communicating with a communication device and ii) transmit one or more data units from to the communication device while applying a steering matrix and a compensation factor set to the plurality of antennas. The network interface includes a calibration controller configured to apply one or more of a plurality of compensation factor sets to the plurality of antennas, wherein each compensation factor set includes at least one compensation factor. The network interface further includes a steering matrix calculation unit configured to develop the steering matrix based on a data unit received from another communication device, a channel performance indicator unit configured to determine a channel performance indicator based on the one or more data units, and a compensation factor selector unit configured to select a compensation factor set to be used in subsequent beamforming operations.

DETAILED DESCRIPTION

While the beamforming techniques described herein for processing and effecting a wireless data transmission are described as being used in communication systems that use one of the IEEE Standard 802.11 communication standards (e.g., IEEE 802.11n), these techniques may be used in various other types of wireless communication systems and are not limited to those conforming to one or more of the IEEE Standard 802.11 standards. For example, these techniques may be used in communications based on the IEEE 802.16e, 802.16j, or 802.16m standards (known as "WiMAX") and others.

Figure 1:
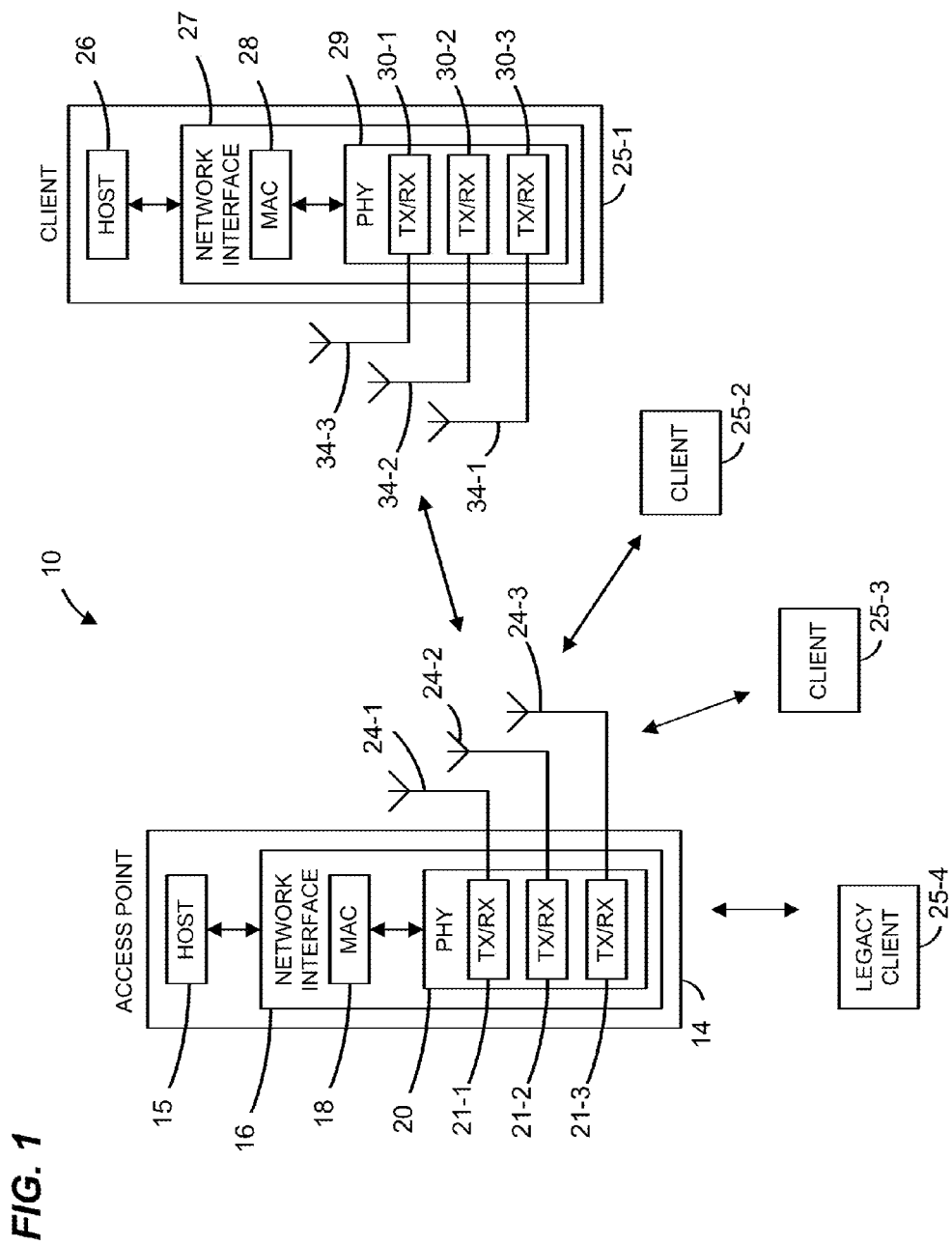
FIG. 1 is a block diagram of an example wireless local area network (WLAN) that utilizes implicit beamforming techniques and calibration procedures set forth in the present disclosure, according to an embodiment.

FIG. 1 is a block diagram of an example wireless local area network (WLAN) 10 that utilizes implicit beamforming techniques and calibration procedures set forth in the present disclosure, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., the IEEE 802.11n Standard) which supports certain frame exchanges and other procedures specifically related to explicit and/or implicit beamforming. In another embodiment, the MAC processing unit 18 and the PHY processing unit 20 are alternatively or additionally configured to operate according to a second communication protocol, which does not explicitly support beamforming (e.g., the IEEE 802.11g Standard, the IEEE 802.11a Standard, etc.). The second communication protocol is herein referred to as a "legacy protocol."

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. At least one of the client stations 25 (e.g., client station 25-1) is configured to operate at least according to the first communication protocol. The WLAN 10 also includes a client station 25-4 that is not configured to operate according to the first communication protocol but is configured to operate according to a legacy protocol, in some embodiments. Accordingly, the client station 25-1 does not explicitly support frame exchanges or other procedures specifically related to beamforming. Such a client station 25-4 is referred to herein as a "legacy client station." In some embodiments and/or scenarios, the WLAN 10 includes more than one legacy client station. In other embodiments and/or scenarios, the WLAN 10 includes no legacy client stations.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments.

In an embodiment, one or more of the client stations 25-2, 25-3, and 25-4 have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In an embodiment, the AP 14 utilizes implicit beamforming for communication with one or more of the client stations 25 in order to increase signal directivity and generally improve quality (e.g., SNR) of the signals received by the client stations. In implicit beamforming, the AP 14 determines the CSI or other measured description of the reverse channel (i.e., the channel from a particular client station, such as the client station 25-1, to the AP 14) from the training signal(s) sent from, for example, the client station 25-1 to the AP 14 thereby avoiding the multiple communications between the AP 14 and the client station 25-1 generally required in explicit beamforming. Further, according to an embodiment, the AP 14 utilizes implicit beamforming for communication with the legacy client station 25-4 which does not support frame exchanges generally required for beamforming, according to an embodiment.

To conduct implicit beamforming, according to one embodiment, the AP 14 implements a "standard" implicit beamforming technique. In this embodiment, the AP 14 transmits to the client station 25-1 a data unit that includes a request to transmit a sounding frame that "sounds" the reverse channel from the client station 25-1 to the AP 14 thereby allowing the AP 14 to fully determine or estimate characteristics of the reverse channel (e.g., to determine CSI or other measured description of the reverse channel). The AP 14 then computes an estimate of the forward channel (i.e., the channel from the AP 14 to the client station 25-1) based on the estimate of the reverse channel by assuming channel reciprocity and, based on the forward channel estimate, generates a steering matrix specifying the beamsteering coefficients that are then applied to the signals to be transmitted to the client station 25-1 to produce the desired transmit gain pattern at the transmitter output.

Alternatively, in another embodiment, the AP 14 conducts implicit beamforming by implementing a "non standard" implicit beamforming. According to this embodiment, the AP 14 determines an estimate of the reverse channel based on a data unit received from the client station 25-1, wherein the received data unit is not specifically related to beamforming (e.g., a non sounding data unit, also referred to herein as a "regular" data unit). More specifically, in this embodiment, the AP 14 receives from the client station 25-1 a regular data unit that does not specifically sound the channel but nonetheless includes training signals (e.g., in a preamble) that allow the AP 14 to determine or estimate characteristics of the reverse channel. Similar to the case of standard implicit beamforming, the AP 14 then computes an estimate of the forward channel from the estimate of the reverse channel by assuming channel reciprocity, and, based on the forward channel estimate, computes a steering matrix to be used for beamforming in the direction of the client station 25-1, according to an embodiment.

Figure 2:
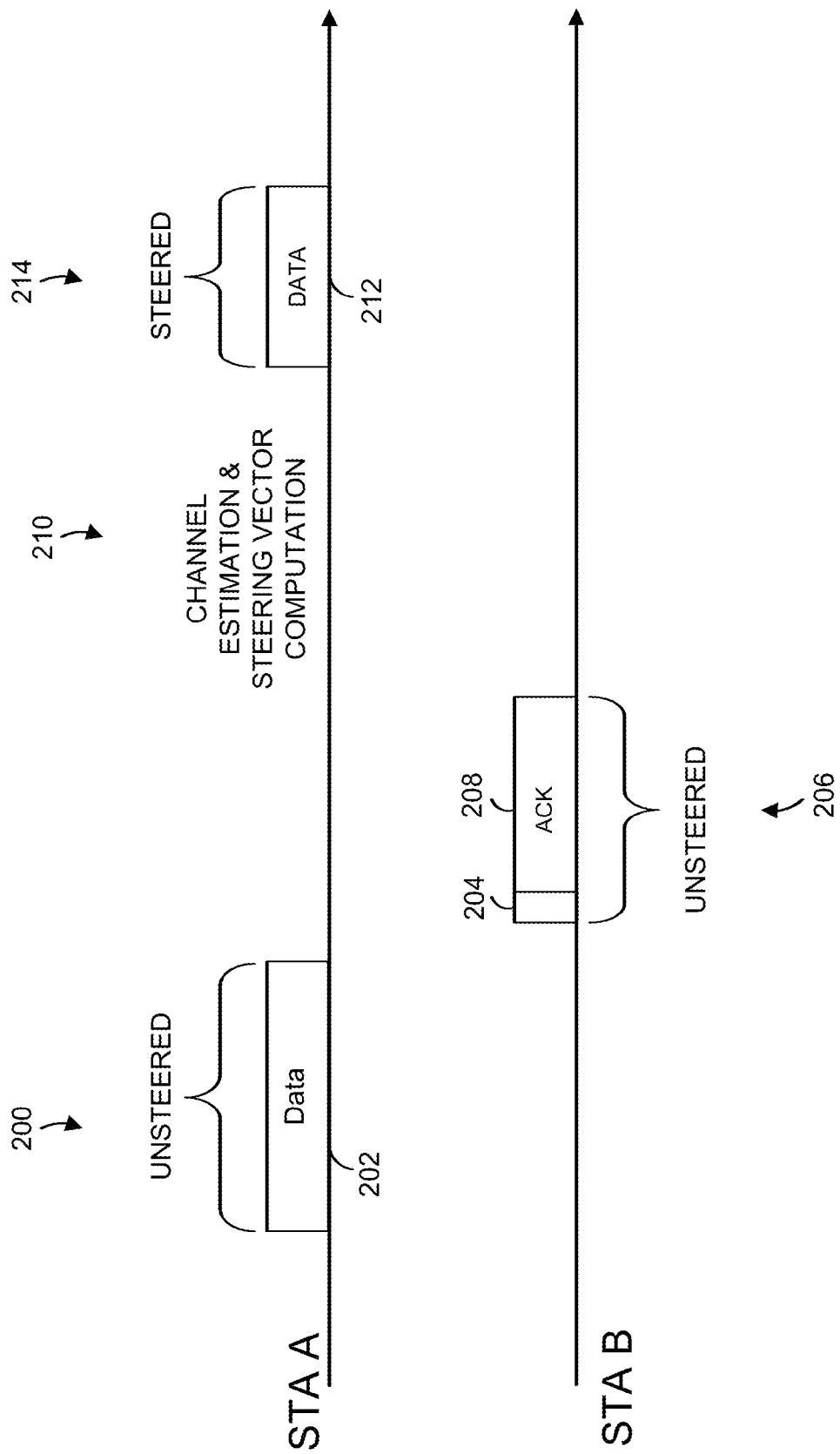
FIG. 2 is a diagram illustrating a specific example of a non standard implicit beamforming technique, according to an embodiment.

FIG. 2 is a diagram illustrating one specific example of a non standard implicit beamforming technique, according to an embodiment. In FIG. 2, Station A is a "beamformer" or a device that transmits or will transmit a data unit using a steering matrix, and Station B is a "beamformee" or a device that receives a data unit transmitted using a steering matrix. Referring to FIG. 1, according to one embodiment, the AP 14 is the beamformer, and the client station 25-1 is the beamformee. In another embodiment, the client station 25-1 is the beamformer, and the AP 14 is the beamformee.

During a time interval 200, Station A transmits an unsteered data unit 202 (i.e., a data unit that is transmitted omni-directionally (as used herein, the term "omni-directional" encompasses the term "pseudo-omni-directional")) to Station B. In an embodiment, the data unit 202 includes an acknowledge (ACK) request that instructs the Station B to transmit an ACK frame upon successful reception of the data unit 202. Accordingly, in response to receiving the data unit 202, Station B transmits an ACK frame 208 to the Station A, wherein the ACK frame includes several training signal fields in a portion 204. In particular, as each training field is transmitted, Station B applies a different mapping of symbols to spatial streams, according to an embodiment. In an embodiment, the number of training fields corresponds to the number of spatial streams used for modulating data units transmitted from Station B to Station A which depends on the particular modulation and coding scheme (MCS) used for communication between Station A and Station B.

During a time interval 210, Station A estimates the MIMO channel in the direction from Station B to Station A (i.e., the reverse channel) based on the training fields of the received ACK frame 208. Station A then generates an estimate of the forward channel using the estimate of the reverse channel and generates a steering matrix for use in forward channel transmissions. As illustrated in FIG. 2, during a time period 214, Station A transmits a data unit 212 using the steering matrix generated in the interval 210.

In some embodiments, the non sounding data frame used by the Station A to estimate the reverse channel is a data unit other than an ACK frame or a NACK frame, i.e., a frame that acknowledges successful receipt of a previous frame, or a frame that indicates unsuccessful receipt of a previous frame, respectively. For example, the non sounding data frame used by the Station A to estimate the reverse channel is a data unit that carries user data, in some embodiments and/or scenarios. Generally, Station A utilizes any suitable non-sounding data unit received from Station B to generate an estimate of the reverse channel as long as the received data unit includes a least one training signal, in various embodiment and/or scenarios.

Referring again to FIG. 1, in one embodiment, the AP 14 implements a non-standard implicit beamforming technique when communicating with the legacy client station 25-4 that does not support certain procedures required for standard explicit or implicit beamforming. For example, the client station 25-4 is not configured to process a request to transmit a sounding frame, according to some embodiments. In some such embodiments, the regular data unit used to estimate the reverse channel includes training data that allows the AP 14 to only partially estimate the reverse channel. In one such embodiment, for example, the client station 25-4 includes three antennas but transmits a data unit to the AP 14 via only two of the antennas (i.e., via two spatial streams). This data unit, therefore, includes training signals that allow the AP 14 to only determine a partial channel estimate (in this case at most a two dimensional channel estimate). In this embodiment, the AP 14 then utilizes the partial channel estimate to generate a steering matrix which results in at least some channel directivity in the direction of the client station 25-4.

As discussed above, to conduct implicit beamforming, such as standard or non-standard implicit beamforming, the AP 14 assumes channel reciprocity to determine an estimate of the forward channel based on an estimate of the reverse channel, according to an embodiment. However, channel estimation is generally conducted at baseband, and therefore, the observed channel contains the equivalent RF responses of the transmit and the receive chains which, according to an embodiment, are not identical in the same device. In this embodiment, channel reciprocity is therefore impaired. To reduce or account for the errors introduced by RF chain impairments in an implicit beamforming technique, in one embodiment, the AP 14 applies a correction matrix to the signals to be transmitted (i.e., the output signals) during the beamforming process to compensate for measured differences between the actual forward and reverse channels. In particular, this technique first determines a correction matrix that at least partially compensates for RF impairments caused by transmit and receive chain imbalance in the communication device. Then, each time a new steering matrix is to be calculated for the forward channel, the beamforming technique applies the correction matrix to a steering matrix determined using a basic implicit beamforming technique, such as a standard or a non standard implicit beamforming technique, so that, once the correction matrix is determined, the transmitter performs implicit beamforming using a measured description of the reverse channel to produce an estimate of the forward channel. Alternatively, in some embodiments, the transmitter calculates correction matrices for its receive chains, so that once the correction matrix is determined, the transmitter applies the correction matrices to the reverse channel estimation, and performs implicit beamforming using a measured description of this processed reverse channel estimate to produce an estimate of the forward channel. In an embodiment, the calibration procedure is conducted infrequently, compared with steering matrix updates. For example, in one embodiment, the calibration procedure is conducted only upon association of the device into the network, upon switching to a new channel, or upon changes in the environment (e.g. a change in temperature).

Referring to FIG. 1, in mathematical terms, the channel between the AP 14 (Station A) and a client station such as, for example, the client station 25-1 (Station B) is generally characterized by:

$$y_B = \tilde{H}_{AB} Q_A x_A + n_B, \quad \text{(Equation 1)}$$

where $y_B$ and $n_B$ are the received signal vector and additive noise vector at Station B, respectively; $\tilde{H}_{AB}$ is the equivalent channel from Station A to Station B; $x_A$ is the signal vector to be transmitted from Station A; and $Q_A$ is the steering matrix (which may be a vector) at Station A. In various embodiments and/or scenarios, the steering matrix $Q_A$ is determined based on the current channel state information (CSI) for the channel between Station A and Station B. For example, the steering matrix $Q_A$ is determined using an explicit beamforming technique or an implicit beamforming technique such as described above in various embodiments and/or scenarios.

As discussed above, in implicit beamforming techniques, the AP 14 determines an estimate for the forward channel based on an estimate of the reverse channel under the assumption of channel reciprocity. In the case of time-division duplexing (TDD), the forward link and the reverse link share the same frequency band, so their physical propagation channels, denoted as $H_{AB}$ and $H_{BA}$ respectively, can be assumed reciprocal ($H_{AB} = H_{AB}^T$), if the channel is varying slowly compared to the interval between forward and reverse link transmissions. Further, in the case of an orthogonal frequency division multiplexing (OFDM) system, according to an embodiment, channel estimation is conducted for each subcarrier, or for a group of adjacent subcarriers, and channel reciprocity is assumed for the forward and the reverse channels at each subcarrier frequency.

However, as discussed above, the actual channels observed at baseband also include the equivalent RF responses of the transmit and receive chains, which is not identical for the transmit and receive chains in the same device, according to some embodiments. In these embodiments, this imbalance results in the actual channels $\tilde{H}_{AB}$ and $\tilde{H}_{AB}$ not being reciprocal. In an embodiment, the mathematical description of this imbalance issue is represented as:

$$\tilde{H}_{AB} = C_{B,Rx} H_{AB} C_{A,Tx}, \quad \text{(Equation 2)}$$

where $C_{B,Rx}$ represents the RF responses at the receive chains of Station B; and where $C_{A,Tx}$ represents the RF responses at the transmit chains of Station A. By ignoring the coupling among transmit and receive chains, the matrices $C_{B,Rx}$ and $C_{B,Rx}$ are approximately modeled, in an embodiment, as diagonal matrices.

The equivalent channel from Station B to Station A, $\tilde{H}_{BA}$, according an embodiment, is represented as:

$$\tilde{H}_{BA} = C_{A,Rx} H_{AB}^T C_{B,Tx}, \quad \text{(Equation 3)}$$

Due to imbalances between the transmit and receive chains at Station A and at Station B, respectively, i.e., $C_{A,Tx} \neq C_{A,Rx}^T$ and/or $C_{B,Tx} \neq C_{B,Rx}^T$, it stands that $\tilde{H}_{AB} \neq \tilde{H}_{BA}^T$.

In some embodiments, one or both devices compensate the transmit and/or the receive RF imbalance at baseband. For example, one or more correction matrices are calculated and then multiplied with the transmitted or received signal vector in the baseband to correct the imbalance and maintain reciprocity between the transmit and receive channels, according to some embodiments and/or scenarios. For example, in one embodiment, a transmitter-side correction matrix $K_{A,Tx}$ and a receiver-side correction matrix $K_{B,Rx}$ are calculated such that they completely compensate for the imbalance. Thus, in this embodiment, a corrected equivalent channel from Station A to Station B $\hat{H}_{AB}$ is then represented as:

$$\hat{H}_{AB} = K_{B,Rx} \tilde{H}_{AB} K_{A,Tx} = \alpha \tilde{H}_{BA}^T, \quad \text{(Equation 4)}$$

where $\alpha$ is a scalar. Equation 4 is indicative of a "strict reciprocity system", i.e., a system that offers full calibration at both the transmitter and receiver. To implement a strict reciprocity system, in an embodiment, Station A left-multiplies the correction matrix $K_{A,Tx}$ with the signal it is to transmit ($Q_A x_A$) at baseband. Also, in this embodiment, upon receiving the signal, Station B left-multiplies the correction matrix $K_{B,Rx}$ with the received signal at baseband.

Alternatively, in another embodiment, only transmitter-side compensation is utilized. In this embodiment, $\hat{H}_{AB}$ is represented as, for example:

$$\hat{H}_{AB} = \tilde{H}_{AB} K_{A,Tx} = D_B \tilde{H}_{BA}^T, \quad \text{(Equation 5)}$$

where $D_B$ is a diagonal matrix representing the imbalance at Station B. Equation 5 is therefore indicative of a "semi-reciprocal system", in this case, because it offers partial calibration, or calibration only on the transmitter side. To implement a semi-reciprocal system, Station A left-multiplies the correction matrix $K_{A,Tx}$ with the signal it is to transmit ($Q_A x_A$) at baseband, according to an embodiment. Upon receiving the signal, in this embodiment, Station B does not apply a correction matrix, such as the correction matrix $K_{B,Rx}$ with the received signal.

In some embodiments, the transmitter-side compensation is also applied at the receiver chains of the same device. That is, in these embodiments, to realize semi-reciprocity, Station A left-multiplies the correction matrix $K_{A,Rx}$ with the reverse channel estimates at baseband:

$$\tilde{H}_{BA} = K_{A,Rx} \tilde{H}_{BA} \quad \text{(Equation 6)}$$

so, $$\hat{H}_{AB} = D'_B \tilde{H}_{BA}^T \quad \text{(Equation 7)}$$

where $K_{A,Rx} = \text{inv}(K_{A,Tx})$.

Further, in some embodiments, the gain mismatch between the receive and the transmit RF chains is small, and RF imbalance compensation is accomplished by only compensating for the phase imbalance. Accordingly, in one such embodiment in which compensation is performed on the transmit side, $\hat{H}_{AB}$ is then expressed as:

$$\hat{H}_{AB} = \tilde{H}_{AB} K_{A,TX} = \tilde{H}_{AB} \begin{bmatrix} e^{j\theta_1} & & & \\ & e^{j\theta_2} & & \\ & & \ddots & \\ & & & e^{j\theta_N} \end{bmatrix} \quad \text{(Equation 8)}$$

Figure 3:
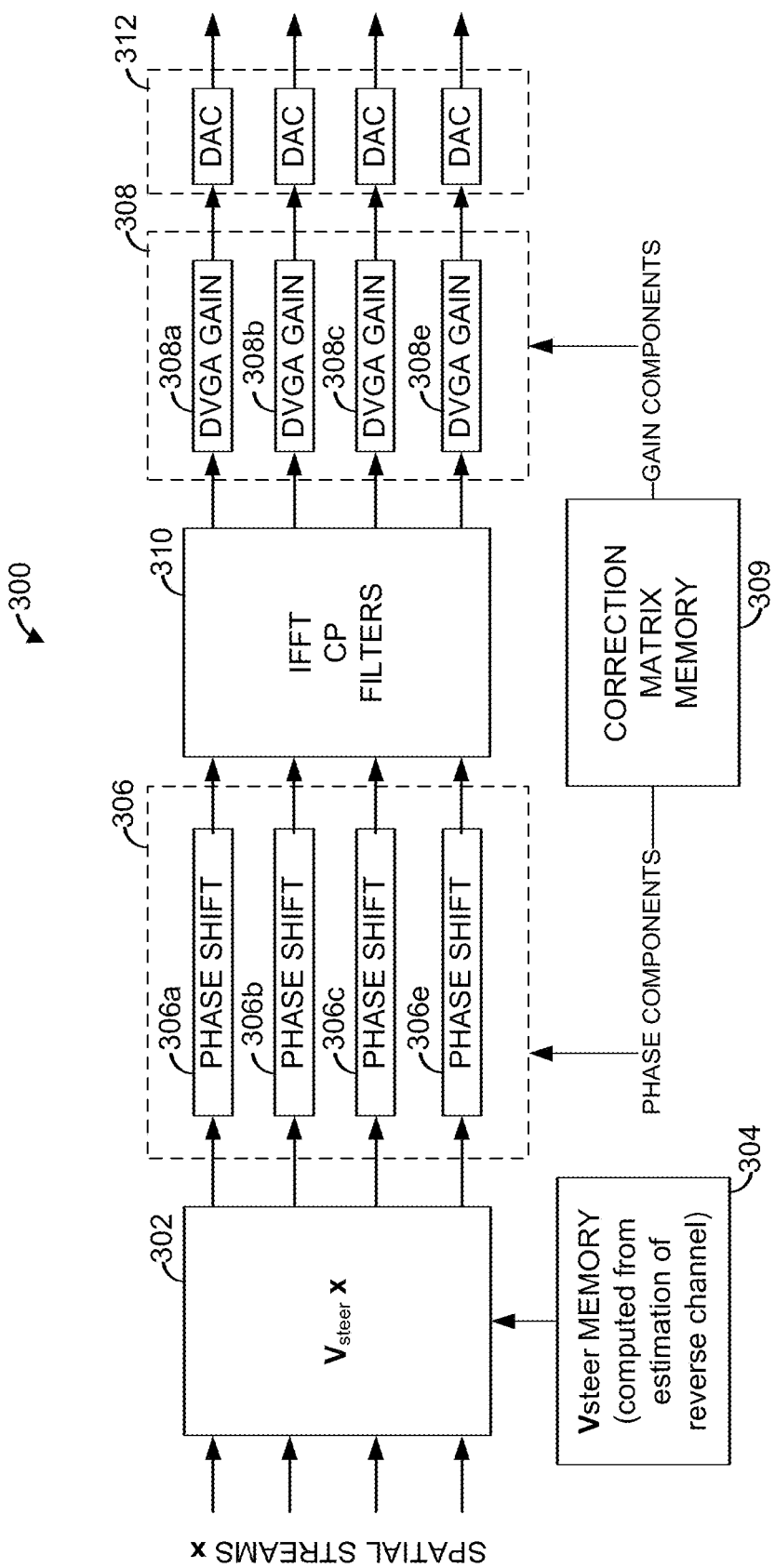
FIG. 3 is a beamsteering unit used to apply a steering matrix and the determined correction matrix to the forward and/or reverse channels in a multi-carrier system, according to an embodiment.

FIG. 3 is diagram of a beamsteering unit 300 used to apply a steering matrix and the determined correction matrix to the forward and/or reverse channels in a multi-carrier system (e.g., as defined in the IEEE 802.11n Standard or any other multi-carrier based communication protocol), according to an embodiment. Referring to FIG. 1, the AP 14 and the client station 25-1, in one embodiment, each include a beamsteering unit such as the beamsteering unit 300. In the description below, the AP 14 a beamformer (Station A) and the client station 25-1 is a beamformee Station B. In some embodiments, however, the client station 25-1 is the beamformer and the AP 14 is the beamformee.

The spatial streams, x, are provided to a beamsteering matrix controller 302, which applies the computed steering matrix, $V_{steer}$, computed as discussed above and stored in a memory 304. When compensating only the phase differences among the antennas on the Station A, the controller 302 provides output signals to a phase correction stage 306, which then applies different phase shifts for each of the output signals, as determined by a correction matrix ($K_{A,Tx}$) stored in a memory 309, e.g., by using only phase components of the correction matrix. In some embodiments, the correction matrix is expressed in terms of gain and phase, whereas in other embodiments the correction matrix is expressed only in terms of phase. In an embodiment, the stage 306 is implemented by different phase shifter stages 306a-306d, one for each transmitter chain In the illustrated embodiment, correction of the phase shift is determined in the frequency domain. The correction occurs at the transmitter of Station A, as shown, or in other examples, at the receiver of Station B. At the transmitter side, according to an embodiment, the correction is performed on each sub-carrier at each transmitter chain, after the beamsteering matrix, $V_{steer}$, has been applied to the signal stream, x.

In some embodiments, Station A also compensates for gain mismatches, by using a gain correction stage 308 implemented, for example, using a digital variable gain amplifier (DVGA). The stage is implemented by different DVGA gain stages 308a-308d, one for each transmit chain, in the illustrated example. In an embodiment, the gain correction stage applies digital gain with correction values, from the correction matrix, $K_{A,Tx}$, to each transmitter chain, where the corresponding matrix multiplication is done in the time domain. In the illustrated example, a processor 310 includes an inverse discrete Fourier transform calculator, e.g., an inverse fast Fourier transform (IFFT) calculator, that converts the phase corrected signal of stage 306 from the frequency domain to the time domain for the gain correction stage 308. Additionally, the processor 310 includes a cyclic prefix (CP) inserter to insert a CP in OFDM symbols to be transmitted. In some embodiments, the processor 310 also includes one or more filters. A corresponding digital-to-analog converter (DAC) 312 generates the corrected signal stream for transmission via a corresponding antenna of Station A.

In some configurations, a MIMO-OFDM transmitter applies time domain cyclic delay diversity (TCDD) after the IFFT and CP insertion performed by the processor 310 on the transmit signals. In some calibration procedures, the Station A turns OFF the TCDD function whenever sending a calibration initiation (e.g. sounding) packet and whenever Station A transmits the steered data packets determined using an implicit beamforming technique. If Station A does not turn OFF TCDD, then in other embodiments and/or scenarios Station A manually applies the TCDD effects (i.e., linear phase shifts across sub-carriers) in the frequency domain of the channel estimations on the packets of the reverse channel.

Figure 4:
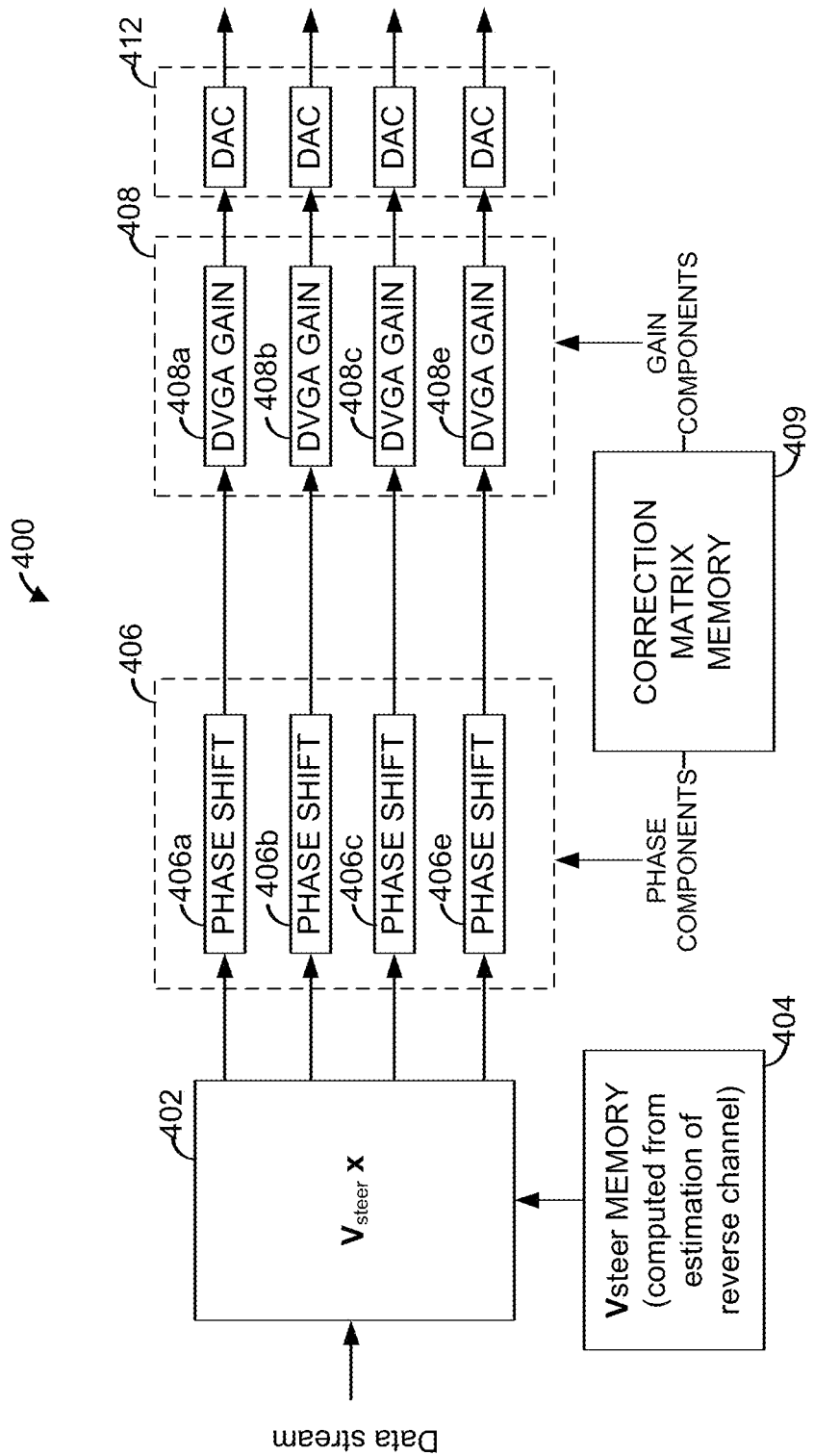
FIG. 4 is a diagram of another beamsteering unit used to apply a steering matrix and the determined correction matrix to the forward and/or reverse channels in a single carrier system, according to another embodiment.

FIG. 4 is a diagram of another example beamsteering unit 400 used to apply a steering matrix and the determined correction matrix to the forward and/or reverse channels in a single carrier system (e.g., as defined by the IEEE 802.11b Standard or any other single-carrier based communication protocol), according to another embodiment. Referring to FIG. 1, the AP 14 and the client station 25-1, in one embodiment, each include a beamsteering unit such as the beamsteering unit 400. In the description below, the AP 14 a beamformer (Station A) and the client station 25-1 is a beamformee Station B. In some embodiments, however, the client station 25-1 is the beamformer and the AP 14 is the beamformee.

The beamsteering unit 400 is similar to the beamsteering 300 of FIG. 3 except that in the beamsteering unit 400 the beamsteering matrix $V_{steer}$ is applied to a single-carrier data stream. Accordingly, in the beamsteering unit 400, a phase shift correction is applied in the time domain rather than the frequency domain. The time-domain correction occurs at the transmitter of Station A, as shown, or in other examples, at the receiver of Station B. At the transmitter side, the correction is performed at each transmitter chain, after the beamsteering matrix, $V_{steer}$, has been applied to the signal stream, x.

In some embodiments, Station A also compensates for gain mismatches, by using a gain correction stage 408 implemented, for example, using a digital variable gain amplifier (DVGA). The stage is implemented by different DVGA gain stages 408a-408d, one for each transmit chain, in the illustrated example. The gain correction stage applies digital gain with correction values, from the correction matrix, $K_{A,Tx}$, to each transmitter chain, where the corresponding matrix multiplication is done in the time domain, according to an embodiment. A corresponding DAC 312 generates the corrected signal stream for transmission via a corresponding antenna of Station A.

In order to, actually determine a correction matrix, such as the correction matrix $K_{A,Tx}$ or the correction matrix $K_{B,Rx}$, in various embodiments, the AP 14 of FIG. 1 conducts a "scanning" calibration procedure by applying one or more possible compensation factors or compensation factor sets to one or more of the output signals (corresponding to one or more antennas 24) as the signals are transmitted to a client station 25. In these embodiment, the AP 14 conducts implicit beamforming while applying the one or more compensation factors or compensation factor set and, based on a metric associated with the communication channel between the AP 14 and the client station, selects a compensation factor or a compensation factor set to be used for implicit beamforming in the direction of the client station. Some such scanning calibration procedures in accordance with some embodiments are described below.

According to one such embodiment, for example, the AP 14 scans through one or more possible phase values and applies each of the one or more possible phase values via, for example, the phase shifters 306 in FIG. 3 or the phase shifter 406 in FIG. 4 to one or more of the output signals. For example, four phase values are used as possible compensation factors in a scanning calibration procedure according to one embodiment. Different numbers of phase values (i.e., 2, 6, 8, 10, etc.) are used as the possible phase compensation factors in other embodiments or scenarios. The AP 14 conducts implicit beamforming and measures channel performance at one or more of the possible phase values (i.e., when the one or more of the possible phase values is applied to the one or more of the output signals) and selects, according to a certain suitable criteria, a phase value or a phase value set to be used as the elements of the correction matrix, according to an embodiment. In such embodiments, the calibration procedure and, accordingly, the correction matrix are used to compensate for only the phase imbalances. In other embodiments, these or similar calibration techniques are used also to perform gain compensation, in which case various possible gain compensation factors are applied via, for example, the DVGA gain blocks 308 in FIG. 3, or the DVGA gain blocks 408 in FIG. 4 to one or more of the output signals during the calibration procedure.

For ease of explanation, the calibration procedures are described below for a case of phase compensation with only two transmit antennas. Accordingly, the possible phase compensation factors need to be applied to only one antenna in the calibration procedures described below. However, similar calibration procedures are used to calibrate more than two (e.g., 3, 4, 5, etc.) antennas in other embodiments. In general, in an embodiment with L possible compensation factors per antenna and $N_{tx}$ transmit antennas, the maximum number of compensation factor sets (i.e., possible compensation factor combinations applied to $N_{tx}-1$ transmit antennas) to be applied during a scanning calibration procedure is $L^{Ntx-1}$. The term "compensation factor set" is used herein to mean a single compensation factor, which, according to an embodiment, includes only a phase value or, in another embodiment, a phase and a gain value, or a combination of multiple compensation factors that are applied to multiple antennas during the calibration process, according to an embodiment.

Referring again to FIG. 1, one or more of the calibration procedures described below in reference to FIGS. 5-8 are implemented by the PHY processing unit 20 and/or the PHY processing unit 29 in various embodiment and/or scenarios. In the embodiments described below, the AP 14 is the beamformer and the client station 25-1 is the beamformee. In other embodiments, however, the client station 25-1 is the beamformer and the AP 14 is the beamformee.

Figure 5:
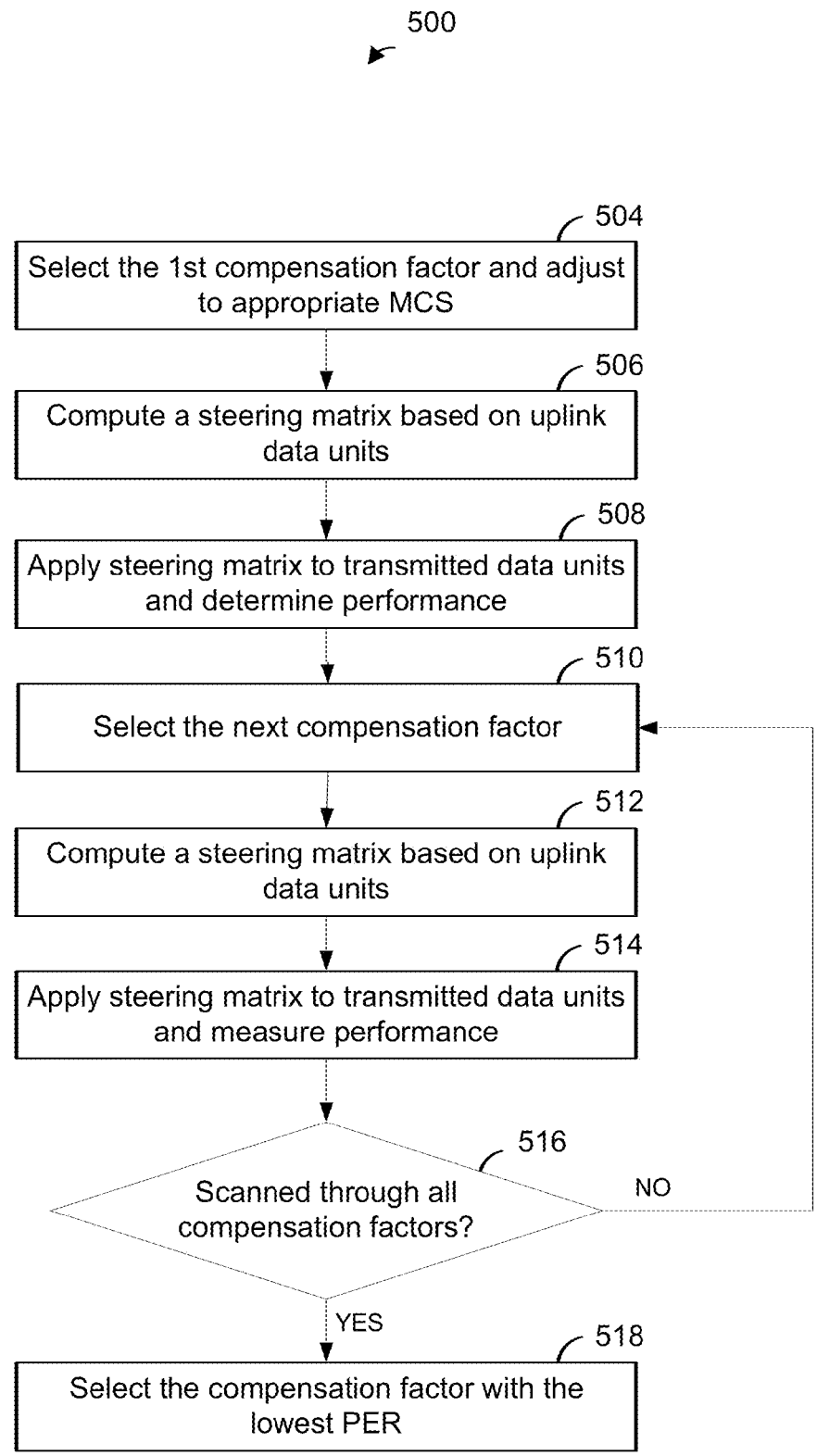
FIG. 5 is a diagram of an example scanning calibration procedure according to an embodiment.

FIG. 5 is a flow diagram of an example scanning calibration procedure 500 according to an embodiment. At block 504, the AP 14 selects a first compensation factor from a set of compensation factors and selects an MCS to be used for communication with the client station 25-1. In an embodiment, the MCS is selected to enhance the detection of performance differences between transmission of data units using different compensation factors. For example, the MCS is selected to be proximate to a level at which a threshold number of errors or threshold error rate is expected to occur. At block 506, the AP 14 applies the first compensation factor while receiving a data unit from the client station 25-1 and computes a steering matrix. At block 508, the AP 14 transmits N data units to the client station 25-1 while applying the steering matrix and the first compensation factor to the output signals and determines channel performance corresponding to the first compensation factor based on the N transmitted data units, where N is a positive integer. For example, in some embodiments, packet error rate (PER) is used as a channel performance metric at block 508. In one such embodiment, the AP 14 determines PER based on a number of ACK frames that the client station 25-1 transmits to the AP 14 upon successful reception of the data units. In other embodiments other suitable performance metrics are used to measure channel performance at block 508. In some embodiments, a performance metric is calculated at the client station 25-1 and the client station 25-1 transmits the performance metric to the AP 14.

At block 510, the AP 14 selects a second compensation factor. At block 512, the AP 14 applies the second compensation factor while receiving a data unit from the client station 25-1 and computes a steering matrix based on the data unit received from the client station 25-1. At block 514, the AP 14 transmits N data units to the client station 25-1 while applying the steering matrix computed at block 512 and the second compensation factor to the output signals and determines channel performance corresponding to use of the second compensation factor based on the N transmitted data units. The same type of metric is used to measure channel performance at blocks 514 and 508, according to an embodiment.

At block 516, it is determined whether all of the possible compensation factors have been analyzed. In other words, block 516 checks if steering matrix computations and channel performance measurements have been performed at every compensation factor intended for the calibration procedure. If it is determined at block 516 that all compensation factors have been analyzed, the AP 14 selects a compensation factor at which the metric corresponds to the best channel performance. For example, in an embodiment in which PER is used as the channel performance metric, the AP 14 selects at block 518 the compensation factor corresponding to the lowest PER. On the other hand, if it is determined at block 516 that not all of the scanning procedure calibration factors have been analyzed, the AP 14 repeats blocks 510, 512 and 514 with respect to a further compensation factor, and checks again if all of the calibration compensation factors have been analyzed at block 516.

According to an embodiment, when conducting the calibration procedure 500, the AP 14 utilizes an MCS that allows the client station 25-1 to receive data units transmitted by the AP 14 at a level proximate to a level at which errors being to increase. Utilizing this sensitivity level MCS allows the AP 14 to, for example, more accurately measure the packet error rate based on the number of ACK frames received from the client station 25-1 at the different calibration factors. For example, if a low throughput MCS is utilized, very low levels of errors may occur when using all of the different calibration factors making it difficult to determine any performance differences between the different calibration factors. Similarly, if a very high throughput MCS is utilized, very high levels of errors may occur when using all of the different calibration factors also making it difficult to determine any performance differences between the different calibration factors.

In some embodiments, the AP 14 does not necessarily scan through all compensation factors intended for the calibration procedure in order to select a compensation factor to be used for implicit beamforming. For example, in some embodiments, the calibration procedure terminates when one of the compensation factors results in channel performance that meets a certain criteria or threshold level of performance.

Figure 6:
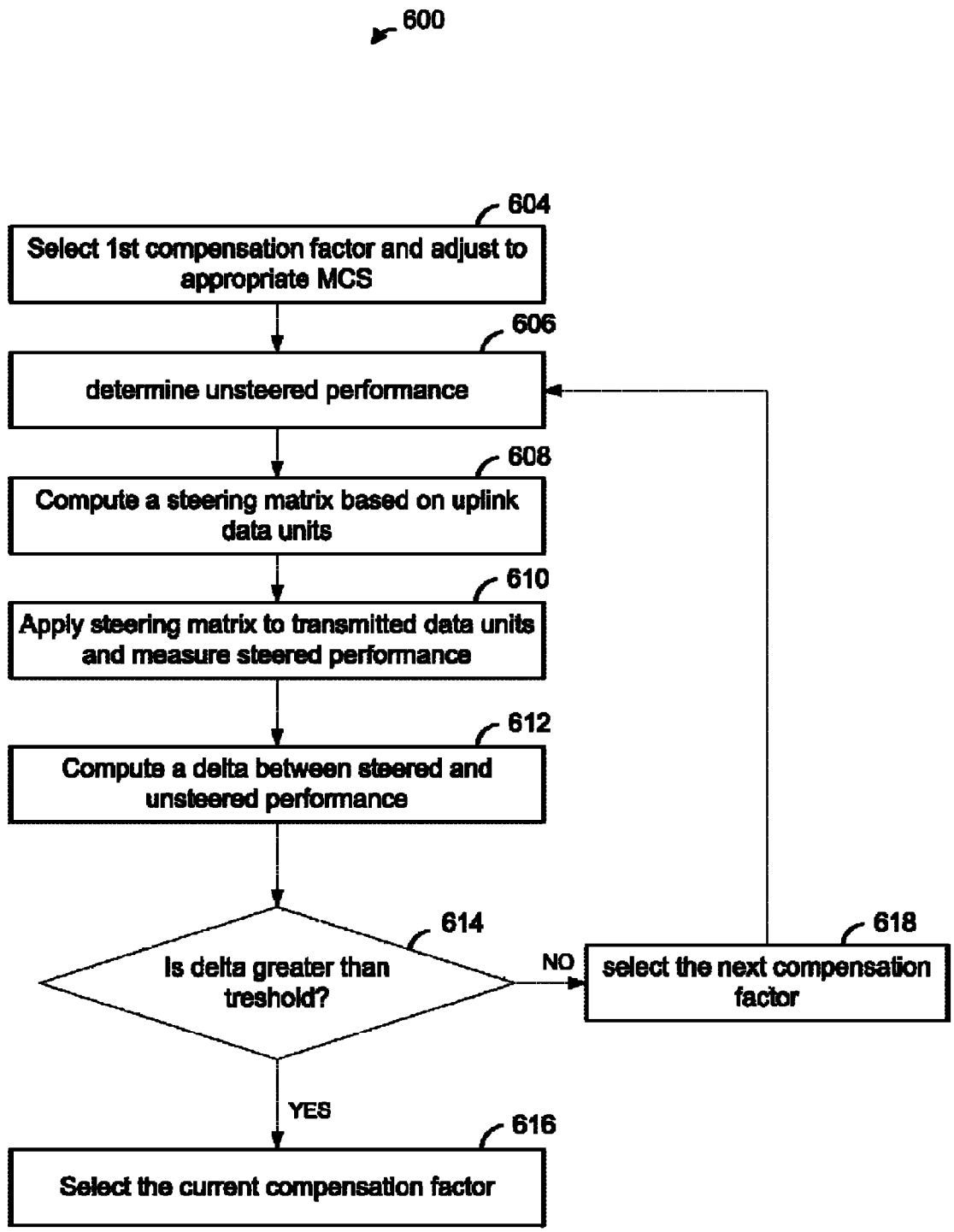
FIG. 6 is a diagram of another example scanning calibration procedure according to another embodiment.

FIG. 6 is a flow diagram of an example calibration procedure 600 according to one such embodiment. At block 604, the AP 14 selects a first compensation factor and selects an MCS, similar to block 504 of FIG. 5. At block 606, the AP 14 transmits N unsteered data units (i.e., without applying a steering matrix to the transmitted signals) and determines channels performance based on the N unsteered data units. For example, similar to channel performance measurements described above in reference to the calibration procedure 500 of FIG. 5, the AP 14 measures PER at block 606 based on the number of ACK frames that the AP 14 receives from the client station 25-1, according to one embodiment. At block 608, the AP 14 conducts implicit beamforming to compute a steering matrix based on data units received from the client station 25-1 while applying the first compensation factor. At block 610, the AP 14 transmits N data units to the client station 25-1 while applying the steering matrix computed at block 608 and the first compensation factor to the transmitted signals and measures channel performance at the first compensation factor based on the N transmitted data units using the same performance metric as the metric used at block 606 (e.g., PER).

At block 612, the AP 14 computes the difference (or delta) between "unsteered" channel performance determined at block 606 and "steered" channel performance determined at block 610. At block 614 it is determined if the delta computed at block 612 is greater than a threshold. In other words, block 614 determines a degree of improvement (or degradation) in channel performance when a steering matrix and the first compensation factor are applied to transmitted signals compared to when signals are transmitted with no steering matrix applied at the first compensation factor. If the delta is greater than the threshold, the current (in this case the first) compensation factor is selected at block 616 and the calibration procedure terminates.

On the other hand, if it is determined at block 614 that the delta is not greater than the threshold, the AP 14 tunes to a next compensation factor at block 618 and repeats blocks 606, 608, 610, 612 and 614 using the second compensation factor. This process continues until either all of the compensation factor have been scanned through or it is determined at block 614 that a compensation factor achieves an improvement in performance that is above a threshold. According to an embodiment, in a case in which sufficient improvement (i.e., improvement that is greater than the threshold) is not observed at any of the possible compensation factors, the calibration procedure 600 is repeated with a lower threshold value.

Figure 7:
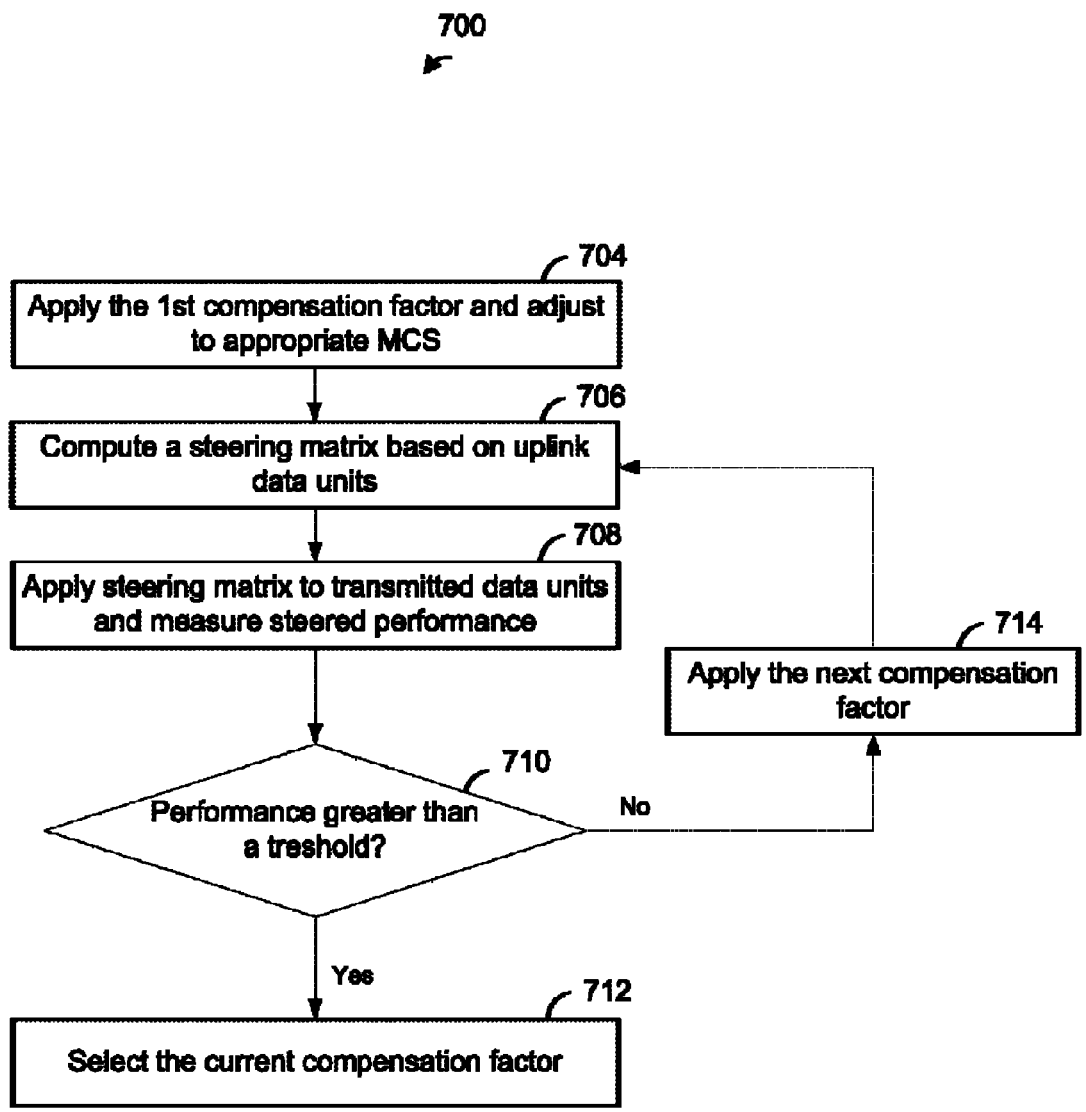
FIG. 7 is a diagram of yet another example scanning calibration procedure according to yet another embodiment.

FIG. 7 is a diagram of another calibration procedure 700 that utilizes a channel performance threshold according to another embodiment. The calibration procedure 700 is similar to the calibration procedure 600 of FIG. 6, except that in the calibration procedure 700 channel performance rather than a channel performance improvement is compared to a threshold. At block 704, the AP 14 selects a first compensation factor and selects an MCS such as described above. At block 706, the AP 14 conducts implicit beamforming to compute a steering matrix based on data units received from the client station 25-1. At block 708, the AP 14 transmits N data units to the client station 25-1 while applying the steering matrix and the first compensation factor to the output signals and determines channel performance corresponding to the first compensation factor based on the N transmitted data units. For example, PER is used as the channel performance metric at block 708, according to one embodiment. As another example, effective MAC throughput is used as the channel performance metric at block 708 in another embodiment. Other suitable metrics for the channel performance are used at block 708 in other embodiments.

At block 710, it is determined whether the measured channel performance is greater than a threshold. If it is determined at block 710 that the measured channel performance is greater than the threshold, the current (in this case the first) compensation factor is selected at block 712 and the calibration procedure terminates. On the other hand, if it is determined at block 710 that the measured channel performance is not greater than the threshold, the AP 14 selects a next compensation factor at block 714 and repeats blocks 706, 708 and 710 using the second compensation factor. This process continues until either all of the possible compensation factors have been scanned through or it is determined at block 710 that a compensation factor achieves channel performance that is above the threshold. In some embodiments, the threshold is originally set high to guarantee good performance and is lowered if no compensation factor achieves the high performance. Alternatively, in another embodiment, the threshold is based on a channel performance measurement for "unsteered" transmissions from the AP 14 to the client station 25-1 and a certain desired beamforming gain. In an embodiment, in this case, the desired beamforming gain is lowered if no compensation factor results in sufficient channel performance (i.e., channel performance that is above the threshold). Accordingly, in an embodiment, in a case in which sufficient channel performance level is not observed at any of the possible compensation factors, the calibration procedure 700 is repeated with a lower threshold value.

Figure 8:
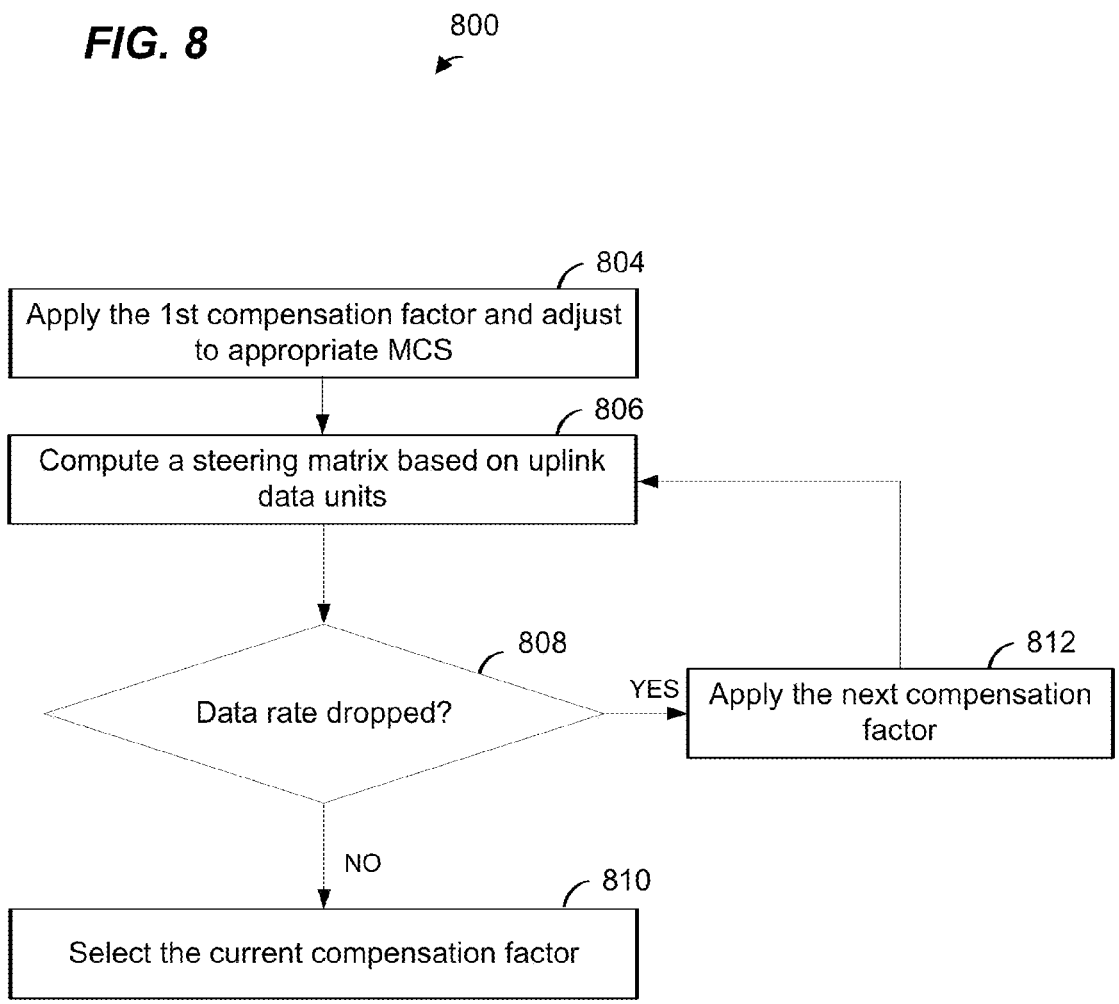
FIG. 8 is a diagram of still another example scanning calibration procedure according to still another embodiment.

FIG. 8 is a diagram of another calibration procedure 800 according to another embodiment. At block 804, the AP 14 selects a first compensation factor and selects an MCS antennas discussed above. At block 806, the AP 14 conducts implicit beamforming to compute a steering matrix based data units received from the client station 25-1. At block 808, it is determined whether a transmission rate has dropped after the steering matrix computed at block 806 and the first compensation factor are applied. If it is determined at block 808 that the rate has dropped, the AP 14 selects a second compensation factor at block 812 and computes a steering matrix using implicit beamforming and the second compensation factor at block 806. At block 808 it is determined whether the data rate has dropped when the second compensation factor and the steering matrix computed using the second compensation factor at block 806 are applied. If it is determined at block 808 that there was no change in the data rate when the steering matrix and the compensation factor are applied, the AP 14 selects the compensation factor and the procedure ends, in one embodiment.

In some embodiments in which the calibration procedure 500, the calibration procedure 600, the calibration procedure 700 and/or the calibration procedure 800 are conducted in a transmitter with more than two transmit antennas, scanning is conducted as described above for only one or for a subset of the transmit antennas. Accordingly, in these embodiments, the best or "full" beamforming gain is achieved for the one or the subset of the transmit antennas for which the calibration is conducted. In one such embodiment, no scanning is conducted for the remaining antennas. In another embodiment, coarser scanning is conducted for all or some of the remaining antennas. That is, in an embodiment, some but not all of the possible compensation factors or compensation factor sets are applied to the remaining antennas or to a subset of the remaining antennas.

In some embodiments, the AP 14 conducts the calibration procedure 500, the calibration procedure 600, the calibration procedure 700 and/or the calibration procedure 800 during normal communication with the client station 25-1. In other words, the data units used to measure channel performance at different compensation factors are regular data units carrying user information data from the AP 14 to the client station 25-1. Therefore, in these embodiments, normal transmissions are not interrupted during the calibration process. Alternatively, in another embodiment, the AP 14 generates management or control frames to be used specifically for the calibration procedure 500, the calibration procedure 600, the calibration procedure 700 and/or the calibration procedure 800 and uses these management or control frames to conduct the calibration procedure.

Figure 9:
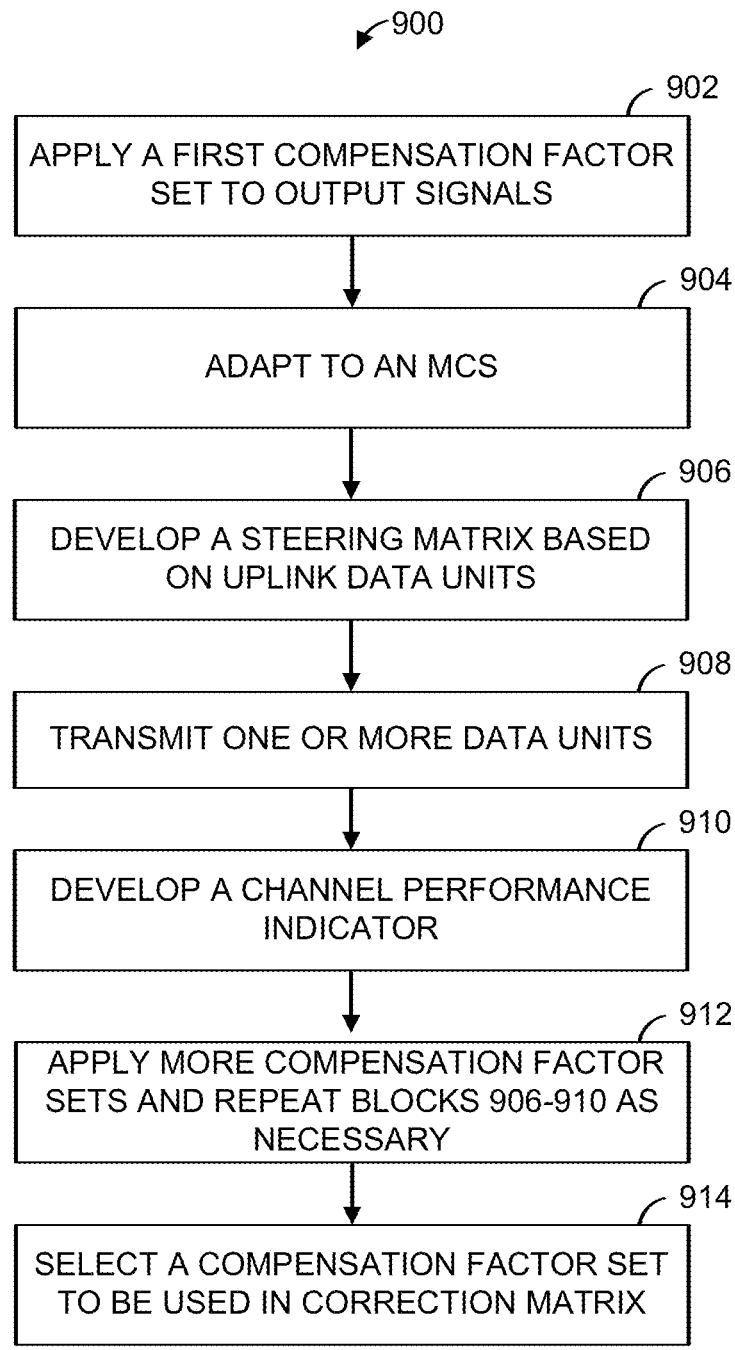
FIG. 9 is a flow diagram of an example method for beamforming in a wireless communication system, according to an embodiment.

FIG. 9 is a flow diagram of an example method 900 for beamforming in a wireless communication system, according to an embodiment. With reference to FIG. 1, the method 900 is implemented by the AP 14, according to the embodiment described below. The method 900 is implemented by a client station 25 according to another embodiment. In other embodiments, the method 900 is implemented by another suitable device.

At block 902, a first compensation factor set is applied to output signals as the signals are transmitted from the AP 14 to a client station, such as the client station 25-1. At block 904, while applying the first compensation factor set to the output signals, the AP 14 adapts to an MCS for communication with the client station 25-1. In one embodiment, the AP 14 selects, at block 904, the MCS that allows the client station 25-1 to operate at a level proximate to a level at which errors begin to increase.

At block 906, the AP 14 develops a steering matrix based on one or more data units received from the client station 25-1 utilizing an implicit beamforming technique. For example, in an embodiment, the steering matrix determined at block 906 is based on training signals included in an acknowledgement frame that the client station 25-1 transmits to the AP 14 upon successful reception of a data unit from the AP 14. In another embodiment, the steering matrix determined at block 906 is based on training signals included in a non-sounding frame that is not an ACK or a NACK.

At block 908, the AP 14 transmits one or more data units to the client station 25-1 while applying the correction factor set and the steering matrix computed at block 906 to the output signals. At block 910, the AP 14 determines a channel performance indicator based on the one or more transmitted data units. For example, in one embodiment, the channel performance indicator is based on the number of acknowledgement frames that the AP 14 receives from the client station 25-1 in response to the transmitted data units.

Depending on the particular embodiment, at block 912, the AP 14 applies another compensation factor set to the transmit antennas, develops a steering matrix based on data units received while applying the new compensation factor set, transmits one or more data units, and determines a channel performance indicator at the new compensation factor, as necessary in accordance with the particular calibration procedure being implemented. For example, in one embodiment, block 912 is performed multiple times until all possible compensation factors (intended for the calibration procedure) are applied to the output signals and a channel performance indicator is determined for each compensation factor, as discussed above in reference to the calibration procedure 500.

In another embodiment, the channel performance indicator determined at block 910 is compared to a threshold at block 912 and the method proceeds to block 914 if the channel performance indicator is above the threshold, as discussed above in reference to the calibration procedure 600 or the calibration procedure 700. In yet another embodiment, it is determined at block 912 whether it is necessary to repeat blocks 906-910 based on the data rate, as discussed above in reference to the calibration procedure 800.

At block 914, the AP 14 selects a compensation factor set to be used for implicit beamforming RF chain compensation in communicating with the client station 25-1.

Figure 10:
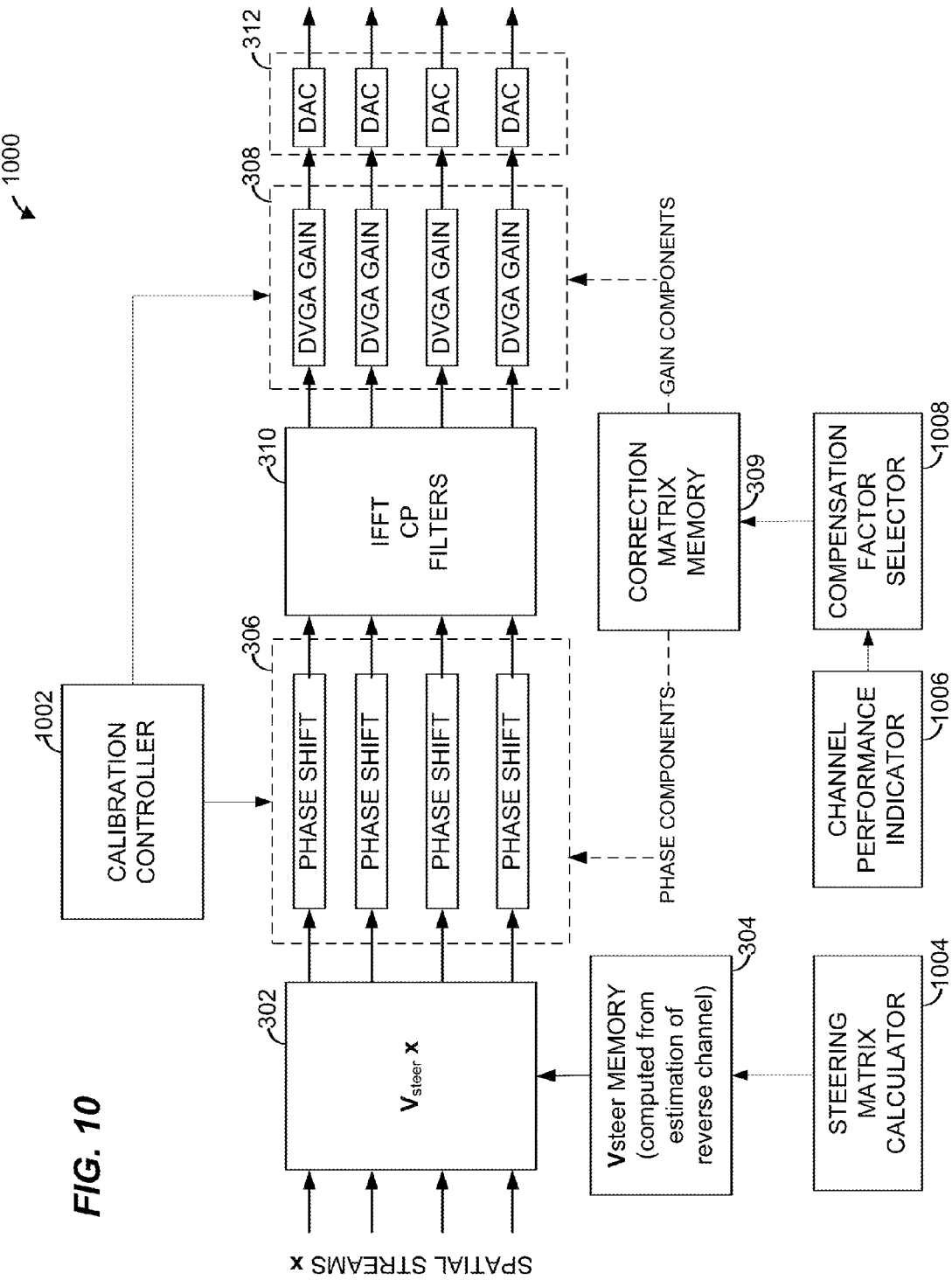
FIG. 10 is a block diagram of a beamsteering unit that conducts one or more of the example calibration procedures, according to an embodiment.

FIG. 10 is a block diagram of a beamsteering unit 1000 that conducts one or more of the example calibration procedures illustrated in FIGS. 5-8, according to an embodiment. Referring to FIG. 1, the beamsteering unit 1000 is included in the PHY processing unit 20 and/or the PHY processing unit 29, according to an embodiment.

The beamsteering unit 1000 is similar to the beamsteering unit 300 of FIG. 3 and the like-numbered elements are not discussed. Additionally, the beamsteering unit 1000 includes a calibration controller 1002 that is configured to apply the various compensation factor sets described above in reference to FIGS. 5-8 to the output signals via the phase shifters 306 and/or the DVGA gain units 308. A steering matrix calculator unit 1004 is configured to compute a steering matrix based on uplink data units, and the steering matrix is then applied to the output signals via the steering matrix unit 302, according to an embodiment.

A channel performance indicator unit 1006 determines or generates a channel measurement in accordance with the calibration procedure 500, the calibration procedure 600, the calibration procedure 700 or the calibration procedure 800, depending on the particular embodiment or scenario. Similarly, the compensation factor selector unit 1008 selects a compensation factor set in accordance with the calibration procedure 500, the calibration procedure 600, the calibration procedure 700 or the calibration procedure 800, depending on the particular embodiment or scenario. In an embodiment, the selected compensation factor set is then recorded in the correction matrix memory 309 and applied via the phase shifters 306 and/or the DVGA gain units 308 to compensate for RF imbalances in various implicit beamforming techniques.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A method for beamforming within a communication system, wherein the communications system includes (i) a first communication device having a first plurality of antennas and (ii) a second communication device having a second plurality of antennas, the method comprising:
   applying one or more of a plurality of compensation factor sets to the first plurality of antennas, wherein each compensation factor set includes at least one compensation factor;
   while applying a first compensation factor set to the first plurality of antennas, selecting a modulation and coding scheme (MCS) for communicating with the second communication device;
   for each of the one or more compensation factor sets
     (i) developing a steering matrix based on a data unit received at the first communication device from the second communication device,
     (ii) transmitting one or more data units from the first communication device to the second communication device while applying the steering matrix and the compensation factor set to the first plurality of antennas, and (iii) determining, at the first communication device, a channel performance indicator based on the one or more data units, including
  (a) determining an unsteered channel performance,
  (b) determining a steered channel performance, and
  (c) determining a channel performance delta, wherein the channel performance delta is the difference between the unsteered channel performance and the steered channel performance; and
selecting, based on the channel performance indicators including the channel performance deltas, a compensation factor set, from the one or more of the plurality of compensation factor sets, to be used in subsequent beamforming operations.

2. A method according to claim 1, wherein:
applying one or more of the plurality of compensation factor sets to the first plurality of antennas comprises applying each compensation factor set in the plurality of compensation factor sets to the first plurality of antennas, and
selecting the compensation factor set comprises selecting the compensation factor set corresponding to a best channel performance as indicated by the channel indicators.

3. A method according to claim 1, wherein
selecting the compensation factor set comprises selecting the first applied compensation factor set at which the channel performance delta is greater than a threshold.

4. A method according to claim 1, wherein:
determining the channel performance indicator comprises determining a steered channel performance indicator, and
selecting the compensation factor set comprises selecting the first applied compensation factor set at which the steered channel performance indicator is greater than a threshold.

5. A method according to claim 1, wherein:
determining the channel performance indicator comprises determining a data rate in communication with the second device, and
selecting the compensation factor set comprises selecting the first applied compensation factor set at which the data rate increases.

6. A method according to claim 5, further comprising applying a next compensation factor set from the plurality of compensation factor sets if the data rate drops.

7. A method according to claim 1, wherein selecting the modulation and coding scheme (MCS) comprises selecting the MCS corresponding to a first level proximate to a second level at which errors begin increasing in data units received by the second communication device.

8. A method according to claim 1, wherein the channel performance indicator is a packet error rate.

9. A method according to claim 8, wherein the packet error rate is determined based on a number of acknowledge (ACK) frames that the second communication device transmits in response to successfully receiving data units.

10. A method according to claim 1, wherein the channel performance indicator is an effective management access control (MAC) throughput.

11. A method according to claim 1, wherein applying one or more of the plurality of compensation factor sets comprises applying one or more of the plurality of compensation factor sets to a first set of antennas of the first plurality of antennas, wherein the set of antennas includes at least one antenna.

12. A method according to claim 11, further comprising applying a subset of the one or more compensation factor sets to a second set of antennas of the first plurality of antennas, wherein the second set of antennas includes at least one antenna.

13. A method according to claim 1, the method conducted in a calibration mode.

14. A method according to claim 1, the method conducted in normal transmission mode.

15. An apparatus for use in a communication system, the apparatus including:
a plurality of antennas; and
a network interface configured to:
  select a modulation and coding scheme (MCS) for communicating with a communication device, and
  transmit one or more data units from the communication device while applying a steering matrix and a compensation factor set to the plurality of antennas;
wherein the network interface includes
  a calibration controller configured to apply one or more of a plurality of compensation factor sets to the plurality of antennas, wherein each compensation factor set includes at least one compensation factor,
  a steering matrix calculation unit configured to develop the steering matrix based on a data unit received from another communication device,
  a channel performance indicator unit configured to, for each of the one or more compensation factor sets,
    (i) determine an unsteered channel performance,
    (ii) determine a steered channel performance, and
    (iii) determine a channel performance delta, wherein the channel performance delta is the difference between the unsteered channel performance and the steered channel performance, and
wherein the network interface further includes a compensation factor selector unit configured to select a compensation factor set, from the one or more of the plurality of compensation factor sets, to be used in subsequent beamforming operations based on the channel performance deltas.

16. An apparatus according to claim 15, wherein the calibration controller is configured to apply each compensation factor set in the plurality of compensation factor sets to the plurality of antennas, and wherein the compensation factor selector unit is configured to select the compensation factor set corresponding to a best channel performance as indicated by the channel indicators.

17. An apparatus according to claim 15, wherein the compensation factor selector unit is configured to select a first applied compensation factor set at which the channel performance delta is greater than a threshold.

18. An apparatus according to claim 15, wherein the channel performance indicator unit is configured to determine a steered channel performance indicator, and wherein the compensation factor selector unit is configured to select a first applied compensation factor set at which the steered channel performance indicator is greater than a threshold.

19. An apparatus according to claim 15, wherein the channel performance indicator is configured to determine a data rate, and wherein compensation factor selector unit is configured to select a first applied compensation factor set at which the data rate increases.

20. An apparatus according to claim 19, wherein the calibration controller is further configured to apply a next compensation factor set from the plurality of compensation factor sets if the data rate drops.

21. An apparatus according to claim 15, wherein the calibration controller is configured to select the MCS corresponding to a first level proximate to a second level at which errors begin increasing in data units received by a receiving device.

22. An apparatus according to claim 15, wherein the channel performance indicator configured to determine a packet error rate.

23. An apparatus according to claim 22, wherein the packet error rate is determined based on a number of acknowledge (ACK) frames.

24. An apparatus according to claim 15, wherein the channel performance indicator is configured to determine an effective management access control (MAC) throughput.

25. An apparatus according to claim 15, wherein the calibration controller is configured to apply one or more of the plurality of compensation factor sets to a first set of antennas of the plurality of antennas, wherein the first set of antennas includes at least one antenna.

26. An apparatus according to claim 25, wherein the calibration controller is further configured to apply a subset of the one or more compensation factor sets to a second set of antennas of the plurality of antennas, wherein the second set of antennas includes at least one antenna.

27. An apparatus according to claim 15, wherein the calibration controller is configured to operate in calibration mode.

28. An apparatus according to claim 15, wherein the calibration controller is configured to operate in normal transmission mode.

* * * * *